(12) United States Patent
Vollert et al.

(10) Patent No.: US 9,932,023 B2
(45) Date of Patent: Apr. 3, 2018

(54) BRAKING DEVICE FOR A BRAKING SYSTEM OF A VEHICLE AND BRAKING SYSTEM FOR A VEHICLE

(71) Applicant: Robert Bosch GmbH, Stuttgart (DE)

(72) Inventors: Herbert Vollert, Vaihingen/Enz (DE); Oliver Leibfried, Siegelsbach (DE); Stefan Strengert, Sr., Stuttgart (DE); Urs Bauer, Sachsenheim (DE); Volkmar Schlotter, Obersulm (DE); Michael Kunz, Steinheim an der Murr (DE); Matthias Kistner, Bretzfeld (DE); Karl-Heinz Willmann, Freiburg (DE); Matthias Schanzenbach, Eberstadt (DE); Suekrue Senol, Kirchheim (DE); Dagobert Masur, Flein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 123 days.

(21) Appl. No.: 14/780,750

(22) PCT Filed: Feb. 27, 2014

(86) PCT No.: PCT/EP2014/053790
§ 371 (c)(1),
(2) Date: Sep. 28, 2015

(87) PCT Pub. No.: WO2014/154437
PCT Pub. Date: Oct. 2, 2014

(65) Prior Publication Data
US 2016/0082938 A1    Mar. 24, 2016

(30) Foreign Application Priority Data

Mar. 28, 2013    (DE) .......................... 10 2013 205 627

(51) Int. Cl.
*B60T 11/224* (2006.01)
*B60T 13/14* (2006.01)
(Continued)

(52) U.S. Cl.
CPC ........... *B60T 11/224* (2013.01); *B60T 13/143* (2013.01); *B60T 13/662* (2013.01); *B60T 13/686* (2013.01); *B60T 8/4081* (2013.01)

(58) Field of Classification Search
CPC .... B60T 11/224; B60T 13/686; B60T 13/662; B60T 13/143; B60T 8/4091
(Continued)

(56) References Cited

U.S. PATENT DOCUMENTS 4,492,413 A * 1/1985 Belart ...................... B60T 8/446
                                                        303/115.4
4,660,898 A * 4/1987 Steffes ..................... B60T 8/44
                                                        303/114.1
(Continued)

FOREIGN PATENT DOCUMENTS

CN      1374218 A       10/2002
CN     102639370 A       8/2012
(Continued)

OTHER PUBLICATIONS

Machine Translation in English for JP 10-67309A; Inventor: Nakano; 11 pages; Retrieve Date: Jun. 29, 2016.*
International Search Report for PCT/EP2014/053790, dated Feb. 27, 2014.

*Primary Examiner* — Thomas J Williams
*Assistant Examiner* — Mariano Sy
(74) *Attorney, Agent, or Firm* — Norton Rose Fulbright US LLP; Gerard Messina

(57) ABSTRACT

The present invention relates to a braking device and to a braking system, each having a master brake cylinder (10) having at least one first pressure chamber (12) that is (Continued)

subdivided or is able to be subdivided at least into a first partial volume (12*a*) and a second partial volume (12*b*), which are hydraulically connectable or connected to a brake fluid reservoir (24), a first brake circuit (28) being hydraulically connectable or connected to the first partial volume (12*a*), and having a valve device (38) that is mechanically designed in such a way that a pressure buildup up to a mechanically specified limit pressure may be brought about in the second partial volume (12*b*), brake fluid being transferable at least into the first brake circuit (28) via at least one subcomponent (38*a*) of the valve device (38), and an exceeding of the limit pressure in the second partial volume (12*b*) being prevented.

18 Claims, 7 Drawing Sheets

(51) Int. Cl.
  *B60T 13/66* (2006.01)
  *B60T 13/68* (2006.01)
  *B60T 8/40* (2006.01)
(58) Field of Classification Search
  USPC .............. 303/115.2, 14, 113.2, 113.3, 119.1; 60/545
  See application file for complete search history.

(56) References Cited

U.S. PATENT DOCUMENTS

| | | | |
|---|---|---|---|
| 4,687,259 A * | 8/1987 | Reinartz | B60T 8/445 188/181 R |
| 4,877,296 A | 10/1989 | Leiber et al. | |
| 5,362,140 A * | 11/1994 | Burgdorf | B60T 8/348 303/113.2 |
| 5,492,394 A * | 2/1996 | Kusano | B60T 8/268 303/113.2 |
| 5,713,640 A * | 2/1998 | Feigel | B60T 8/3265 303/115.2 |
| 6,604,795 B2 | 8/2003 | Isono et al. | |
| 7,008,023 B2 | 3/2006 | Nakashima et al. | |
| 9,643,582 B2 * | 5/2017 | Lhuillier | B60T 13/145 |
| 2011/0115282 A1* | 5/2011 | Dinkel | B60T 7/042 303/3 |
| 2013/0234501 A1* | 9/2013 | Leiber | B60T 8/4018 303/10 |
| 2013/0298550 A1* | 11/2013 | Leiber | B60T 7/042 60/545 |

FOREIGN PATENT DOCUMENTS

| | | |
|---|---|---|
| CN | 102729969 A | 10/2012 |
| DE | 10304144 A1 | 8/2004 |
| DE | 102011006327 | 12/2011 |
| FR | 2967120 | 5/2012 |
| FR | 2975957 | 12/2012 |
| JP | S611569 A | 1/1986 |
| JP | 10067309 A * | 3/1998 |
| JP | 2003034244 A | 2/2003 |

* cited by examiner

BRAKING DEVICE FOR A BRAKING SYSTEM OF A VEHICLE AND BRAKING SYSTEM FOR A VEHICLE

The present invention relates to a braking device for a braking system of a vehicle. In addition, the present invention relates to a braking system for a vehicle.

BACKGROUND OF THE INVENTION

In DE 10 2011 006 327 A1, a braking system for motor vehicles is described. The braking system has a master brake cylinder having a stepped piston that, with a first active surface, limits a pressure space formed in the master brake cylinder, and with a second active surface limits a filling space situated before the pressure space. In a central bore of the stepped piston there is fashioned a valve configuration by which a hydraulic connection between the pressure space and the filling space is intended to be freely switchable in such a way that when a vehicle deceleration of about 0.3 g is achieved, a driver brakes into the master brake cylinder only with the first active surface. The pressure space and the filling space are hydraulically connected to a brake fluid reservoir/pressure medium container via bores. Moreover, a braking circuit can be hydraulically connected to the pressure space. In addition, the braking system of DE 10 2011 006 327 A1 is also intended to be capable of working together with a pneumatic, electrical, or electrohydraulic pressure provision unit in order to apply pressure to wheel brakes.

DISCLOSURE OF THE INVENTION

The present invention creates a braking device for a braking system of a vehicle having the features of Claim 1, and a braking system for a vehicle having the features of Claim 9.

Advantages of the Invention

Through the additional transferring of brake fluid from the second partial volume at least in the first brake circuit due to the advantageous design of the valve device, the brake pressure that may be built up in at least one first wheel brake cylinder of the first brake circuit may be increased. As is described in more detail below, in particular given the presence of air in at least one brake circuit, a brake pressure that may be built up in the at least one wheel brake cylinder of the brake circuit can, using the present invention, be significantly increased through the advantageous design of the valve device.

Preferably, the braking device includes an electrically controllable valve via which the second partial volume is able to be connected or is connected to the brake fluid reservoir in such a way that, when the electrically controllable valve is in the open state, the second partial volume is without pressure despite the shifting of the second piston wall, and when the electrically controllable valve is in its closed state, the pressure buildup may be brought about up to the limit pressure mechanically specified in the valve device, by shifting the second piston wall. Through the advantageous equipping of the braking device with the electrically controllable valve, it may be ensured that in a normal operating mode of the braking device, the driver brakes into the first pressure chamber only using a first surface of the first piston wall. Already before a pressure buildup in the master brake cylinder, the electrically controllable valve is able to be controlled to its open state in such a way that the second partial volume is without pressure, and thus does not present any resistance to a concomitant shifting of the second piston wall together with the first piston wall. Thus, in the normal operating mode the driver need brake into the first pressure chamber of the master brake cylinder only with the first surface of the first piston wall. In this way, in the normal operating mode of the braking device the driver experiences a pleasant brake actuation "feel" or sensation (pedal sensation).

Moreover, the braking device may be operated in a fallback mode in which the brake surface by which the driver brakes into the first pressure chamber may be increased relative to the normal operating mode. Through an (automatic) controlling of the electrically controllable valve in its closed state, an additional pressure buildup in the second partial volume may be realized. In addition, through the advantageous mechanical realization of the valve device, it may be ensured that the pressure in the second partial volume (barely) exceeds a mechanically specified limit pressure. Thus, in fallback mode as well it is ensured that the driver experiences the actuation of the brake actuating element, such as a brake pedal, as pleasant.

In an advantageous specific embodiment, the master brake cylinder can include a second pressure chamber and a floating piston situated displaceably between the first partial volume of the first pressure chamber and the second pressure chamber, a second brake circuit being hydraulically connectable or connected to the second pressure chamber. In this way, the braking device can advantageously be used in a two-circuit braking system as well.

In particular, the second partial volume may be additionally connected to the second brake circuit via a further subcomponent of the valve device in such a way that brake fluid may be transferred into the second brake circuit via at least the further subcomponent of the valve device. In this way, a brake pressure that may be built up in at least one second wheel brake cylinder of the second brake circuit can also be increased. Above all, in this way for example a presence of air in the second brake circuit may be counteracted.

In a further advantageous specific embodiment, the master brake cylinder has a stepped bore within which at least the first pressure chamber is formed, the master brake cylinder having a stepped piston as the at least one displaceable rod piston, which, with its first piston wall, limits the first partial volume and with its second piston wall limits the second partial volume. However, it is to be noted that such a realization of the master brake cylinder is optional. For example, the master brake cylinder can also be equipped with a plurality of stepped pistons that may be displaced into separately present chambers of the master brake cylinder by actuating a brake actuating element. In this way, a multiplicity of different designs of the master brake cylinder may be suitable for the realization of the advantageous braking device.

For example, the valve device can have an excess pressure relief valve via which the second partial volume is able to be connected or is connected to the brake fluid reservoir, and can have, as a subcomponent of the valve device, at least one check valve via which the second partial volume is able to be connected or is connected at least to the first brake circuit. In this way, low-cost components may be used to realize the valve device.

As a development, the valve device can in addition have a further check valve via which the second partial volume is able to be connected or is connected to the second brake circuit. Through the additional capability of transferring brake fluid from the second partial volume into the second brake circuit, it is possible to realize an increase in the brake pressure that may be built up in the at least one second wheel brake cylinder of the second brake circuit, using a low-cost valve device.

As an alternative to the specific embodiments described above, the valve device can have a regulated check valve via which the second partial volume is able to be connected or is connected to the brake fluid reservoir, and can have, as subcomponent of the valve device, at least one check valve via which the second partial volume is able to be connected or is connected at least to the first brake circuit. This specific embodiment of the brake circuit can also be produced at low cost.

The advantages stated above are also brought about in a correspondingly fashioned braking system.

In an advantageous development, the braking system can have an external force braking device. In the normal operating mode of the braking system that may be realized in the manner described above, the external force braking device may be used to build up/increase the brake pressure in the wheel brake cylinders of the braking system.

In an advantageous specific embodiment, the valve device can have an excess pressure relief valve via which the second partial volume is able to be connected or is connected to the brake fluid reservoir, and can have, as subcomponent of the valve device, at least one lip seal of the external force braking device fashioned as a plunger. Thus, given such a low-cost realization of the external force braking device, the use of at least one check valve may be done without. In this way, the constructive space requirement and production costs of the advantageously fashioned braking system may be reduced.

In a further advantageous development, the braking system has a control device that is designed to control, in the normal mode, at least one component of the braking system in such a way that the pressure buildup may be brought about up to the limit pressure mechanically specified in the valve device, by shifting the second piston wall in the second partial volume. In order to realize the pressure buildup, for example a piston may be moved using a motor that is connected to the piston for example mechanically and/or hydraulically. In this way, the braking system is also suitable for parallel feeding. This advantage can correspondingly also be carried over to a braking device having such a control device.

BRIEF DESCRIPTION OF THE DRAWINGS

Further features and advantages of the present invention are explained in the following on the basis of the Figures.

SPECIFIC EMBODIMENTS OF THE INVENTION

Figure 1:
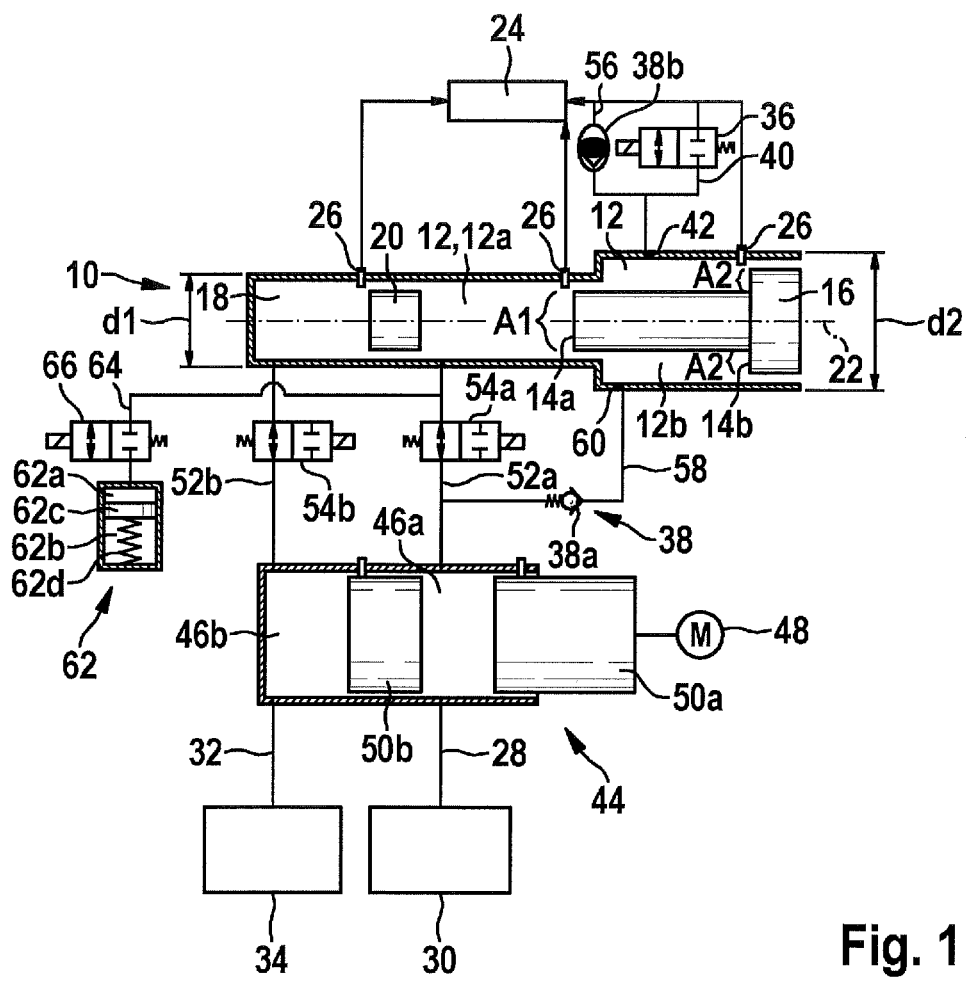
FIG. 1 shows a schematic representation of a first specific embodiment of the braking system.

FIG. 1 shows a schematic representation of a first specific embodiment of the braking system.

The braking system for a vehicle shown schematically in FIG. 1 has a master brake cylinder 10 having at least one first pressure chamber 12 that is subdivided, or is able to be subdivided, into a first partial volume 12a and a second partial volume 12b. First partial volume 12a is limited by a first piston wall 14a of at least one displaceable rod piston 16 in such a way that a first volume of first partial volume 12a is variable by shifting first piston wall 14a. Moreover, second partial volume 12b is limited by a second piston wall 14b of the at least one displaceable rod piston 16 in such a way that a second volume of second partial volume 14b is variable by shifting second piston wall 14b. Partial volumes 12a and 12b may be fashioned for example as two separate chambers, or chambers that are able to be separated hydraulically by a valve component.

In the specific embodiment of FIG. 1, master brake cylinder 10 also has a second pressure chamber 18 and a floating piston 20 displaceably situated between first partial volume 12a of first pressure chamber 12 and second pressure chamber 18. In this way, master brake cylinder 10 can also be used as a "modified" tandem master brake cylinder. However, it is to be noted that a realization of the master brake cylinder with two pressure chambers 12 and 18 is optional.

In the specific embodiment of FIG. 1, master brake cylinder 10 moreover has a stepped bore within which at least first pressure chamber 12 is fashioned. For example, the stepped bore can have a first (inner) inner diameter d1 oriented perpendicular to a direction of displacement 22 of the at least one displaceable rod piston 16 and/or of floating piston 20, which diameter is smaller than a second (outer) inner diameter d2, oriented perpendicular to direction of displacement 22, of the stepped bore. First partial volume 12a and/or second pressure chamber 18 can have first/inner diameter d1 perpendicular to direction of displacement 22, while second partial volume 12b has second/outer inner diameter d2 perpendicular to direction of displacement 22. Master brake cylinder 10 can also have a stepped piston 16 as the at least one displaceable rod piston 16, which limits, with first piston wall 14a, first partial volume 12a, and with second piston wall 14b limits second partial volume 12b. In this way, second partial volume 12b can also be fashioned as an annular volume. However, it is to be noted that the realization of master brake cylinder 10 shown in FIG. 1 is to be interpreted only as an example. A design of master brake cylinder 10 that deviates from the representation in FIG. 1 can also be used to realize the braking system described below.

The braking system also has a brake fluid reservoir 24, at least first partial volume 12a and second partial volume 12b being connectable/connected hydraulically to brake fluid reservoir 24. Second pressure chamber 18 can also be connectable/connected to brake fluid reservoir 24. For example, volumes 12a, 12b, and 18 may be hydraulically connectable/connected to brake fluid reservoir 24 via a respective orifice bore 26.

The braking system also has at least one first brake circuit 28 having at least one first wheel brake cylinder 30, first brake circuit 28 being hydraulically connectable/connected to first partial volume 12a. Preferably, a second brake circuit 32 having at least one second wheel brake cylinder 34 is also hydraulically connectable/connected to second pressure chamber 18. However, the braking system described here is not limited to a design having two brake circuits 28 and 32. Likewise, the number of wheel brake cylinders 30 and 34 that may be used in a brake circuit 28 and 32 may be selected relatively freely. In addition, a multiplicity of different hydraulic components, such as pumps and/or valves, may be used in brake circuits 28 and 32.

The braking system preferably also has an electrically controllable valve 36 via which second partial volume 12b is connected to brake fluid reservoir 24. Electrically controllable valve 36 is in this case placed between second partial volume 12b and brake fluid reservoir 24 in such a way that, when electrically controllable valve 36 is in its open state, second partial volume 12 is without pressure despite shifting of second piston wall 14b. However, the equipping of the braking system with electrically controllable valve 36 is optional.

The braking system has a valve device 38, second partial volume 12b being connected at least to first brake circuit 28 via at least one subcomponent 38a of valve device 38. Moreover, the valve device 38 is mechanically designed in such a way that (if electrically controllable valve 36 that may be present is in its closed state) in second partial volume 12b a pressure buildup may be brought about up to a limit pressure, mechanically specified at valve device 38, by shifting second piston wall 14b. In addition, brake fluid is able to be transferred at least into first brake circuit 28 via at least subcomponent 38a of valve device 38. Moreover, due to the realization of valve device 38 it is ensured that despite a further shifting of the second piston wall (14b), an increase of the limit pressure in the second partial volume (12b) is prevented. The limit pressure may be for example between 1 and 3 bar, in particular 2 bar. A pressure threshold from which brake fluid flows from second partial volume 12b at least into first brake circuit 28 may be approximately 0.5 bar.

Due to its advantageous design, the braking system may be operated in a normal operating mode in which the driver brakes at least into first pressure chamber 12 only using a first surface A1 of first piston wall 14a limiting first partial volume 12a. This may be ensured by controlling electrically controllable valve 36 to its open state. This can also be described by saying that in the normal operating mode second partial volume 12b is short-circuited with brake fluid reservoir 24 by opening electrically controllable valve 36. When a rapid braking is recognized, such as in particular an emergency braking, the time of this controlling may be temporally moved back in order to improve the pressure buildup dynamic in this operating situation. After the opening of electrically controllable valve 36, a concomitant shifting of second piston wall 14b together with first piston wall 14a is not connected with a buildup of pressure in second partial volume 12b. Therefore, in the normal operating mode of the braking device/braking system, due to the comparatively small braking surface for braking at least into first pressure chamber 12, equal to first surface A1, the driver will experience a pleasant brake actuation feeling (pedal feel).

The braking system can also be operated in a fallback mode in which the braking surface (for braking at least into first pressure chamber 12) is increased compared to the normal operating mode. Through (automatic) controlling of the electrically controllable valve 36 in its closed state, an additional pressure buildup may be realized in second partial volume 12b. The (overall) braking surface (for braking at least into first pressure chamber 12) active in fallback mode thus corresponds to a sum of first surface A1 and a second surface A2 of second piston wall 14b limiting second partial volume 12b. Through the enlargement of the braking surface (for braking at least into first pressure chamber 12) to the sum of surfaces A1 and A2, the transformation ratio of master brake cylinder 10 is increased, so that, for a particular braking force exerted by the driver, the driver can bring about still greater brake pressures in wheel brake cylinders 30 and 34 of the braking system. In this way, the effects of the operating states to be taken into account can also be reduced.

At the same time, through the advantageous mechanical realization of the valve device 38, it is ensured that the pressure in second partial volume 12b (barely) exceeds a limit pressure that is mechanically specified. Thus, in fallback mode as well it is ensured that the driver will experience the actuation of the brake actuating element as pleasant. Through the transferring of brake fluid from second partial volume 12b at least into first brake circuit 28, the brake pressure that may be built up in the at least one first wheel brake cylinder 30 of first brake circuit 28 can moreover be increased. Here it is expressly to be noted that a sudden emptying of second partial volume 12b after a comparatively strong pressure buildup in second partial volume 12b is prevented by the present design of the valve device 38. In this way, in fallback mode as well a sudden falling off of the driver braking force is prevented. This ensures that even in fallback mode no irregularities will occur during brake actuation.

The braking system may be operated in the fallback mode in particular in the case of a partial failure or complete failure of at least one electrical component of the braking system, or in the case of a failure of the vehicle electrical system. Thus, even in such an error situation it is reliably ensured that the driver of the vehicle equipped with the braking system can still comfortably bring the vehicle to a stop.

In the fallback mode/mechanical fallback level, a electrically controllable valve 36 is controlled in its closed state. If electrically controllable valve 36 is realized as a currentlessly closed valve, this is automatically realized by interrupting the power supply to electrically controllable valve 36.

Valve device 38 can for example be mechanically designed for a brake pressure between 1 bar and 3 bar, such as in particular for a brake pressure of 2 bar. Through the mechanical design of valve device 38 for determining the brake pressure, it may be ensured that the valve device 38 still reliably carries out its desired function even in the case of a total failure of the vehicle electrical system.

Electrically controllable valve 36 is preferably set in a line 40 that extends from a bore 42 of master brake cylinder 10 at second partial volume 12b to brake fluid reservoir 24. It is to be noted that bore 42 is not to be understood as an orifice opening 26. Thus, bore 42 itself is still open even when there is a significant displacement of second piston wall 14b into second partial volume 12b.

Preferably, the braking system also includes an external force braking device 44 by which the brake pressure buildup in wheel brake cylinders 30 and 34 may be carried out or supported during normal operating mode. External force braking device 44 may be a pneumatic, electrical, or electrohydraulic external force braking device 44. In this way, during normal operating mode the driver need brake into master brake cylinder 10 only with a relatively low braking force and comparatively small first surface A1.

In the specific embodiment shown in FIG. 1, external force braking device 44 is a plunger 44 whose two pressure chambers 46a and 46b are limited by a respective piston 50a and 50b that may be displaced by operation of a motor 48. First brake circuit 28 is connected to first pressure chamber 46a of plunger 44, while second pressure chamber 46b of plunger 44 is allocated to second brake circuit 32. Each of the pressure chambers 46a and 46b of the plunger is connected hydraulically to master brake cylinder 10 via a respective line 52a and 52b, each having a separating valve 54a and 54b set therein, first pressure chamber 46a of plunger 44 being hydraulically connected to first partial volume 12a, and second pressure chamber 46b of plunger 44 being hydraulically connected to second pressure chamber 18. Master brake cylinder 10 can thus be decoupled from brake circuits 28 and 32 by closing separating valves 54a and 54b. In this way it may be ensured that when the braking system is in normal operating mode, a brake pressure buildup in wheel brake cylinders 30 and 34 is brought about exclusively by plunger 44, while in the fallback mode master brake cylinder 10 may be used to build up the desired high brake pressure in wheel brake cylinders 30 and 34. Plunger 44 is preferably self-locking.

Electrically controllable valve 36 may be realized as a currentlessly closed valve. Correspondingly, currentlessly open valves may be used as separating valves 54a and 54b. In this way, it may be ensured that when there is a failure of a vehicle electrical system, the braking system can automatically be controlled from normal operating mode to fallback mode.

In the specific embodiment of FIG. 1, valve device 38 has a check valve 38a as the at least one subcomponent 38a via which second partial volume 12b is connected at least to first brake circuit 28. Check valve 38a, via which brake fluid may be transferred from second partial volume 12b into first brake circuit 38, may be set in a line 58 that extends from a further bore 60 of master brake cylinder 10 to second partial volume 12b, in the direction toward first brake circuit 28. For example, line 58 can open into line 52a. Further bore 60 is fashioned on master brake cylinder 10 in such a way that it remains open even when second piston wall 14b is displaced significantly inward. Moreover, valve device 38 has an excess pressure relief valve 38b via which second partial volume 12b is connected to brake fluid reservoir 24. Excess pressure relief valve 38b can in particular be situated in a bypass line 56 that runs parallel to electrically controllable valve 36.

As an additional feature, the braking system of FIG. 1 also has an optional simulator device 62. Simulator device 62 has a pressure chamber 62a, a spring chamber 62b, and a piston 62c, situated displaceably between pressure chamber 62a and spring chamber 62b, that may be displaced into simulator chamber 62b against a spring force of at least one simulator spring 62b. Pressure chamber 62a is connected optionally, via a line 64, to first partial volume 12a or to second pressure chamber 18. Via a further separating valve 66, preferably realized as a currentlessly closed valve, simulator device 62 may be automatically decoupled from the braking system in the case of a vehicle electrical system failure. In this way it may be ensured that when in fallback mode, simulator device 62 does not work against the driver in the building up of a brake pressure in wheel brake cylinders 30 and 34.

Figure 2:
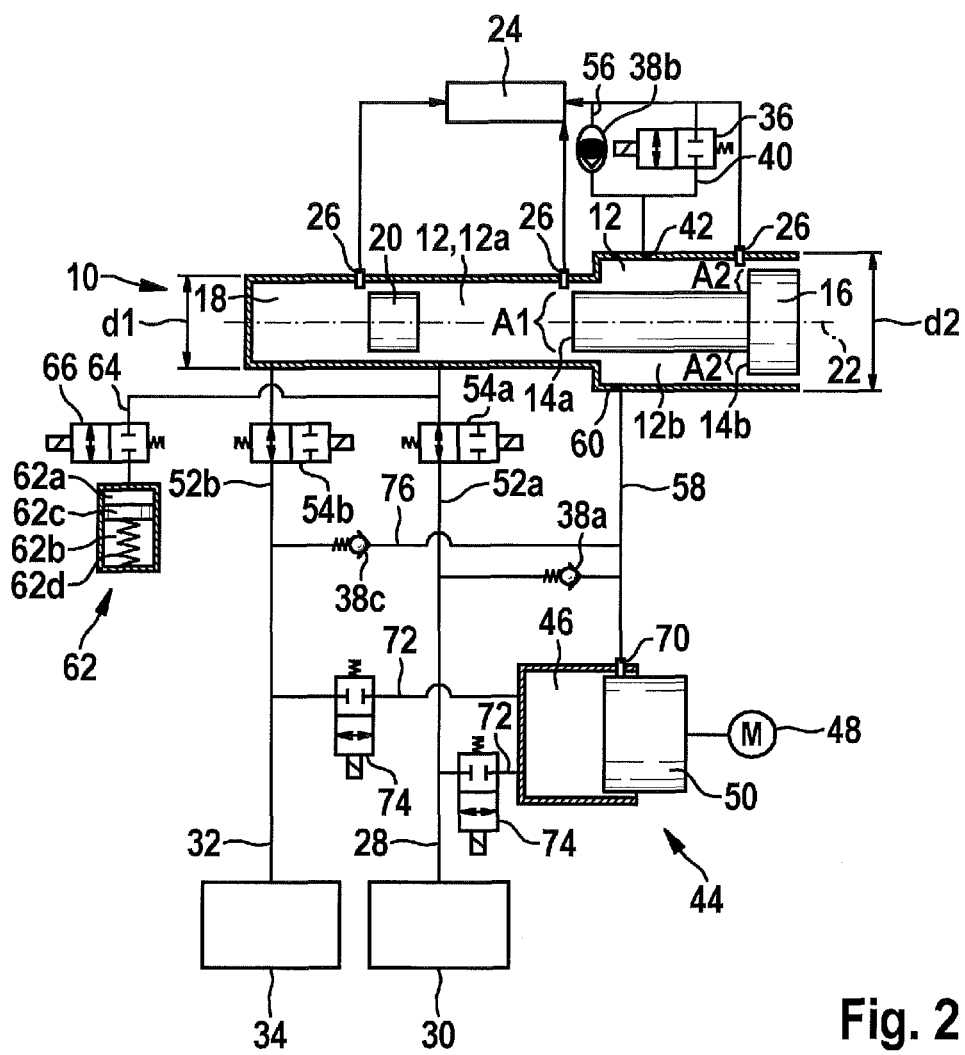
FIG. 2 shows a schematic representation of a second specific embodiment of the braking system.

FIG. 2 shows a schematic representation of a second specific embodiment of the braking system.

The braking system shown schematically in FIG. 2 has, differing from the above-described specific embodiment, an external force braking device 44 that is fashioned as a plunger 44 having only a pressure chamber 46 and a piston 50 that may be displaced using motor 48. Pressure chamber 46 of plunger 44 is connected, via a bore/seal 70, to a segment of line 58 situated between bore 60 and check valve 38a. Moreover, pressure chamber 46 of plunger 44 is connected to each brake circuit 28 and 32 via a respective line 72 with a respective currentlessly closed separating valve 74 set therein. Given such a design of external force braking device 44 as well, the brake pressure present in all wheel brake cylinders 30 and 34 of brake circuits 28 and 32 may be freely adjusted in normal operating mode.

In the braking system of FIG. 2, second partial volume 12b is moreover additionally connected, via at least one further subcomponent 38c of valve device 38, to second brake circuit 32 in such a way that brake fluid may be transferred into second brake circuit 32 via at least the further subcomponent 38c of valve device 38. In this way, the braking force exerted on second partial volume 12b by the driver in fallback mode can also be used to increase the brake pressure in the at least one second wheel brake cylinder 34 of second brake circuit 33. As is stated more precisely below, in this way the brake pressure that may be brought about in the at least one second wheel brake cylinder 34 of second brake circuit 32 may be significantly increased. As further subcomponent 38c, valve device 38 has a further check valve 38c via which second partial volume 12b is connected to second brake circuit 32. This may be realized easily by setting further check valve 38b in a line 76 that runs from a segment of line 58 situated between bore 60 and check valve 38a to second brake circuit 32.

Figure 3:
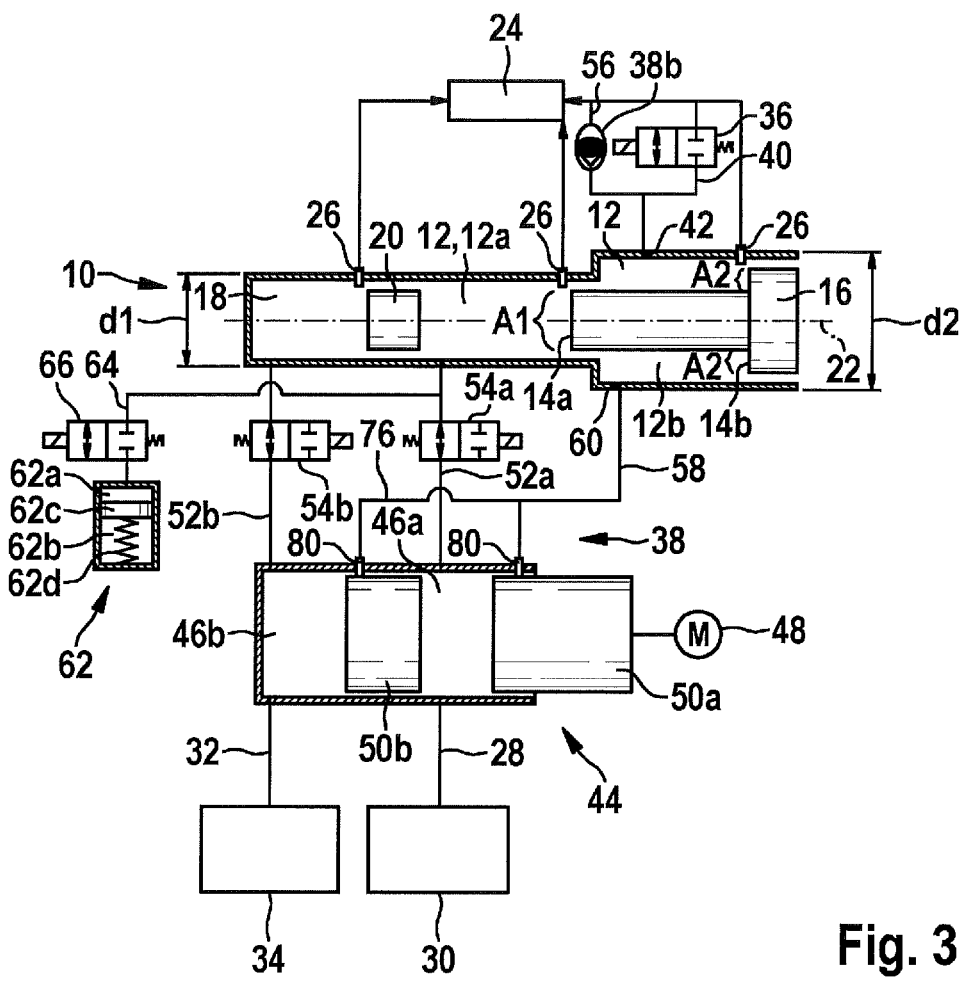
FIG. 3 shows a schematic representation of a third specific embodiment of the braking system.

FIG. 3 shows a schematic representation of a third specific embodiment of the braking system.

In contrast to the specific embodiment of FIG. 1, the braking system shown in FIG. 3 has a valve device 38 that has, in addition to excess pressure relief valve 38b via which second partial volume 12b is connected to brake fluid reservoir 24, at least one lip seal 80 of external force braking device 44 fashioned as plunger 44. In this way, the equipping of the braking system with at least one check valve may be done without in the design of the braking system. In this way, the production costs and a constructive space requirement of the braking system of FIG. 3 may be reduced.

Figure 4:
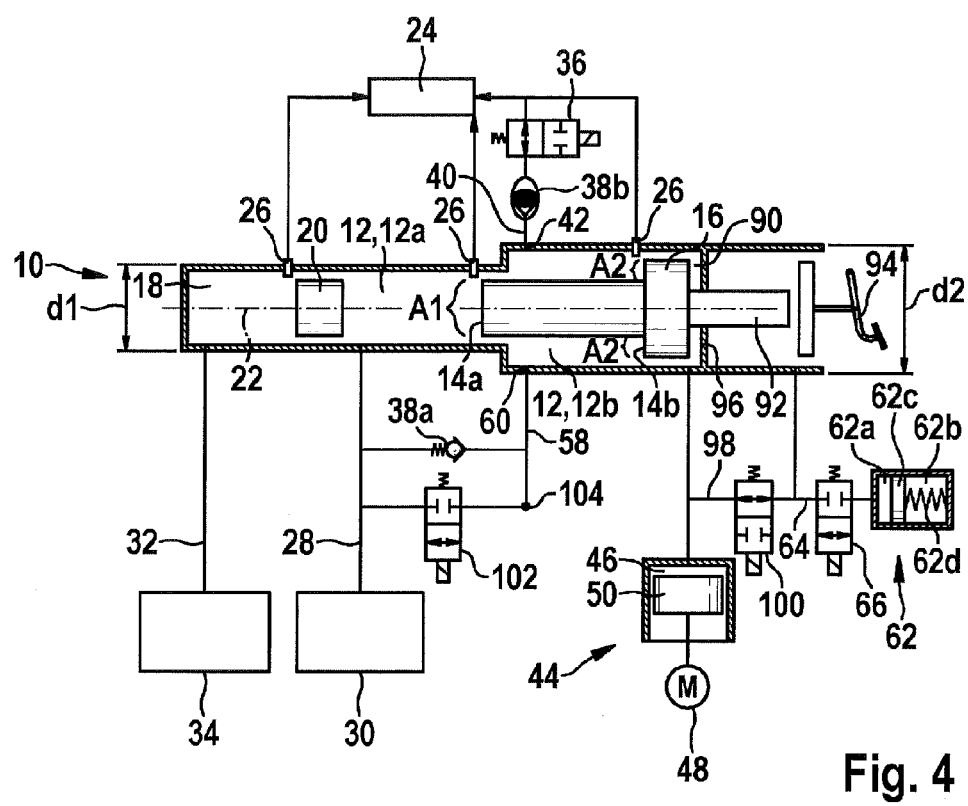
FIG. 4 shows a schematic representation of a fourth specific embodiment of the braking system.

FIG. 4 shows a schematic representation of a fourth specific embodiment of the braking system.

The braking system shown in FIG. 4 has a master brake cylinder 10 whose rod piston 16, fashioned as stepped piston 16, is displaceably situated between first pressure chamber 12 and a pressure buildup chamber 90. An output piston 92 extends from stepped piston 60 in the direction toward a brake actuating element 94, such as a brake pedal 94. Output piston 92 is guided through an opening in an outer wall 96 of master brake cylinder 10 that limits pressure buildup chamber 90 at a side oriented toward brake actuating element 94. Outer wall 96 is fashioned in fluid-tight fashion in such a way that a brake fluid volume may be transferred between pressure chamber 46 of external force braking device 44 and pressure buildup chamber 90 via a displacement of piston 50 of external force braking device 44. Thus, external force braking device 44 can also be connected before master brake cylinder 10.

Simulator device 62 is also connected to pressure buildup chamber 90. This is realized in that line 64 having separating valve 66 opens into a line 98 having a (preferably currentlessly open) separating valve 100 that connects pressure buildup chamber 90 to a pre-chamber (not shown) between outer wall 96 and brake actuating element 94. External force braking device 44 can also be connected to line 98, external force braking device 44 preferably being connected between pressure buildup chamber 90 and separating valve 100, and simulator device 62 preferably being connected between separating valve 100 and the pre-chamber.

In the braking system of FIG. 4, electrically controllable valve 36 and excess pressure relief valve 38b are configured in series in line 40. Electrically controllable valve 36 is preferably set in a segment of line 40 that runs between excess pressure relief valve 38b and brake fluid reservoir 24.

As a supplement to the specific embodiments described above, the braking system also has a separating valve 102 that is currentlessly closed, set in a line 104 that runs parallel to check valve 38a. The braking system of FIG. 4 also reliably ensures all the advantages described above.

The specific embodiment of the braking system shown schematically in FIG. 4 can also be operated in a manner differing from the above specific embodiments. Here, second partial volume 12b, in a normal operating mode, is switched in such a way that a pressure buildup may be brought about therein by displacing second piston surface 14b, and the two partial volumes 12a and 12b may be used for a parallel feeding. The corresponding "switching" of second partial volume 12b may be carried out by a control device (not shown) that is designed to control, in the normal mode, at least one component of the braking system, such as for example at least electrically controllable valve 36, in such a way that the pressure buildup may be brought about up to the limit pressure specified mechanically at valve device 38, by shifting second piston wall 14b in second partial volume 12b. At a fallback level, the coupling of surfaces A1 and A2 may be set as a function of a pressure.

By an operation of motor 48, piston 16 may be moved for a brake force braking or for a brake force boost. As an alternative to the hydraulic transmission of force shown in FIG. 4, a mechanical transmission of force between piston 16 and motor 48 is also possible.

FIGS. 5a through 5e show a schematic representation of a fifth specific embodiment of the braking system and coordinate systems for the explanation of the operation thereof.

Figure 5A:
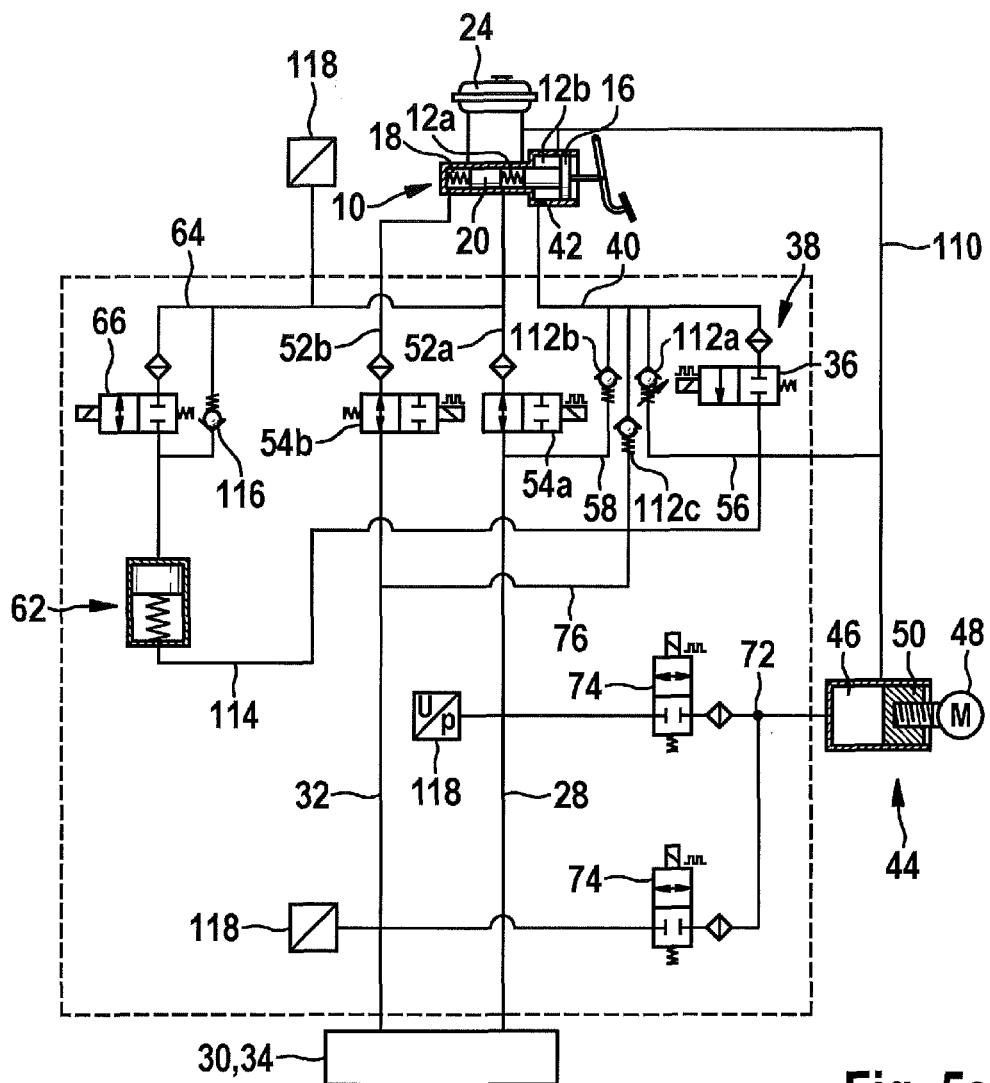
FIGS. 5a through 5e show a schematic representation of a fifth specific embodiment of the braking system and coordinate systems for the explanation of the operation thereof.

The braking system shown in FIG. 5a has a master brake cylinder 10 at whose second partial volume 12b only one bore 42 is fashioned. Line 40 with electrically controllable valve 36 set therein runs between bore 42 and a line 110 via which pressure chamber 46 of plunger 44 is connected to brake fluid reservoir 24. (Pressure chamber 46 of plunger 44 can optionally be connected via a line 114 to spring chamber 62b of simulator device 62.)

Valve device 38 has a regulated check valve 112a, which is set in bypass line 56 routed parallel to electrically controllable valve 36, and via which partial volume 12b is connected to brake fluid reservoir 24. Moreover, valve device 38 has at least one check valve 112b and 112c via which second partial volume 12b is connected at least to first brake circuit 28. In the specific embodiment of FIG. 5a, second partial volume 12b is, specifically, hydraulically connected to first brake circuit 28 via a first check valve 112b set into line 58, and to second brake circuit 32 via a second check valve 112c set into line 76. Additionally, the braking system can optionally also have a check valve 116 situated parallel to separating valve 66 of simulator device 62, and can have at least one sensor 118.

A brake fluid transfer from second volume 12 into brake circuits 28 and 32 and into brake fluid reservoir 24 can also be controlled mechanically via the closing pressures of check valves 112a through 112c, using valve device 38 of FIG. 5a. Regulated check valve 112a defines the limit pressure as the maximum permissible pressure in second partial volume 12b. Via check valves 112b and 112c, a pressure threshold (pressure difference) may be defined between brake circuits 28 and 32 and second partial volume 12b. If the pressure in second partial volume 12b exceeds this pressure threshold, then brake fluid flows from second partial volume 12b into brake circuits 28 and 32. This state is maintained until either the pressure falls below the pressure threshold due to the increasing of the brake circuit pressures, or the limit pressure specified by regulated check valve 112a is exceeded in second partial volume 12b.

The braking system of FIG. 5a as well thus enables, at the fallback level, a braking into the two brake circuits 28 and 32 with an increased braking surface, equal to the sum of the hydraulically active surfaces A1 and A2. This is a significant improvement for the braking characteristic at the mechanical fallback level compared to a braking using the two hydraulically active surfaces A1 and A2 into only one of the two brake circuits 28 and 32.

FIGS. 5b through 5e show coordinate systems whose abscissas indicate a pedal path s (in millimeters) and whose ordinates indicate a pressure p1/p2 (in bar). On the basis of the coordinate systems of FIGS. 5b through 5e, in the following it is explained how strongly the brake pressure in brake circuits 28 and 32 may be increased during fallback mode via the transfer of brake fluid.

Figure 5B:
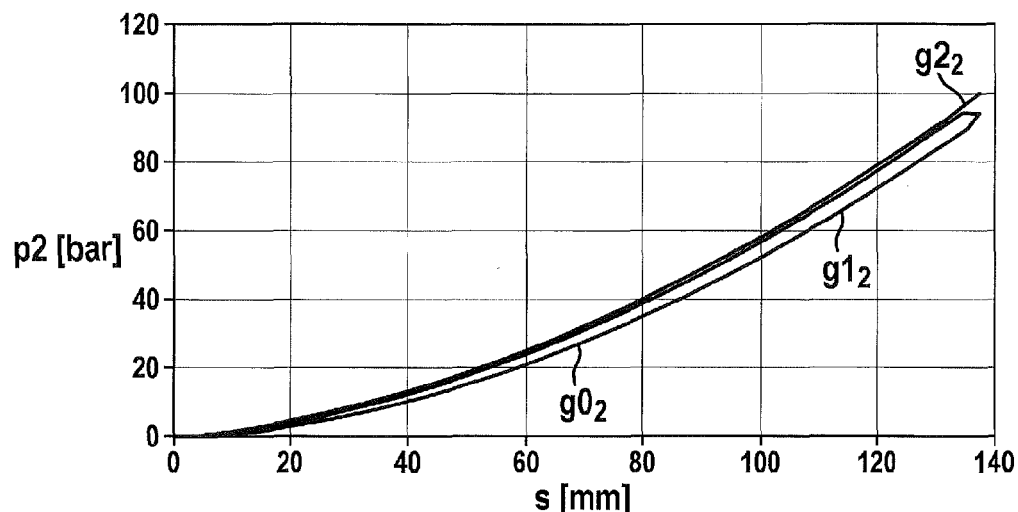
Figure 5C:
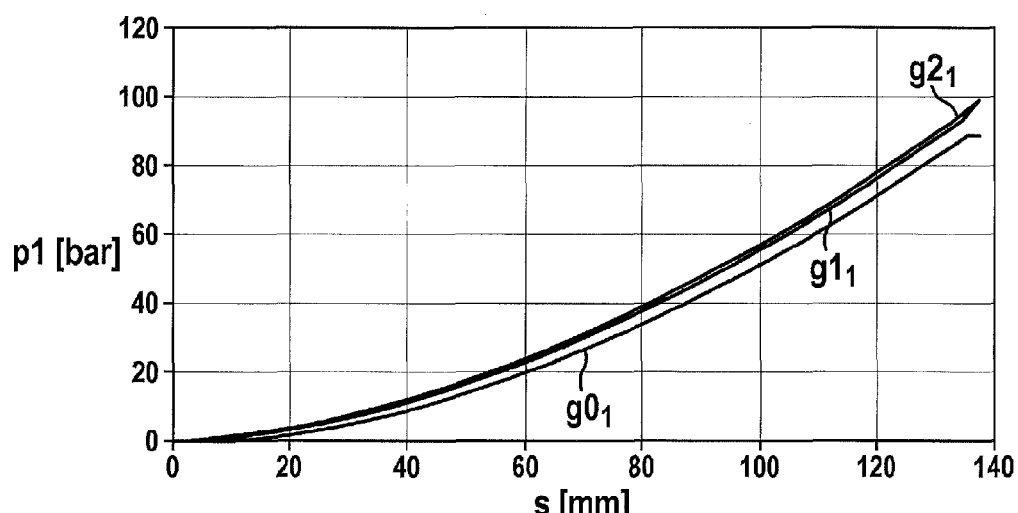

The coordinate systems of FIGS. 5b and 5c depict a situation in which at the beginning of the braking there is no air in brake circuits 28 and 32:

Second brake pressures p2 (in bar) acting in second brake circuit 32 are shown via the coordinate system of FIG. 5b. The graph $g0_2$ indicates the second brake pressure p2 that is present in second brake circuit 32 under standard conditions, i.e. without a transfer of brake fluid from second partial volume 12b in one of the two brake circuits 28 and 32. Graph $g1_2$ shows second brake pressure p2 that would be present in second brake circuit 32 if brake fluid were to be fed only into first brake circuit 28 from second partial volume 12b. Graph $g2_2$ shows the second brake pressure p2 that may be brought about through the feeding of brake fluid from second partial volume 12b into the two brake circuits 28 and 32. It can be seen that, via the transferability of brake fluid from second partial volume 12b into the two brake circuits 28 and 32, the second brake pressure p2 that may be brought about given a comparatively large pedal path s in second brake circuit 32 may be significantly increased. Graph $g2_2$ has for example a maximum pressure of 100 bar, while graphs $g0_2$ and $g1_2$ each have a maximum pressure of 93 bar.

In the coordinate system of FIG. 5c, the first brake pressure p1 (in bar) that may be brought about in first brake circuit 28 is shown. Here, graph $g0_1$ shows the first brake pressure p1 that may be brought about in first brake circuit 28 under standard conditions, i.e. without a transfer of brake fluid from second partial volume 12b in one of the two brake circuits 28 and 32. The values of graph $g1_1$ correspond to the values of first brake pressure p1 that may be brought about given a feeding of brake fluid from second partial volume 12b only into first brake circuit 28. Through an additional feeding of brake fluid from second partial volume 12b into second brake circuit 32, with a simultaneous filling of first brake circuit 28 (from second partial volume 12b), first brake pressure p1 is barely impaired, given a comparatively large pedal path s, as can be seen on the basis of graph $g2_1$. It is true that, at 97 bar, graph $g2_1$ has a slightly reduced maximum pressure compared to a maximum pressure of 99 bar in graph $g1_1$, but these values are significantly higher than the maximum pressure of 89 bar in graph $g0_1$.

Figure 5D:
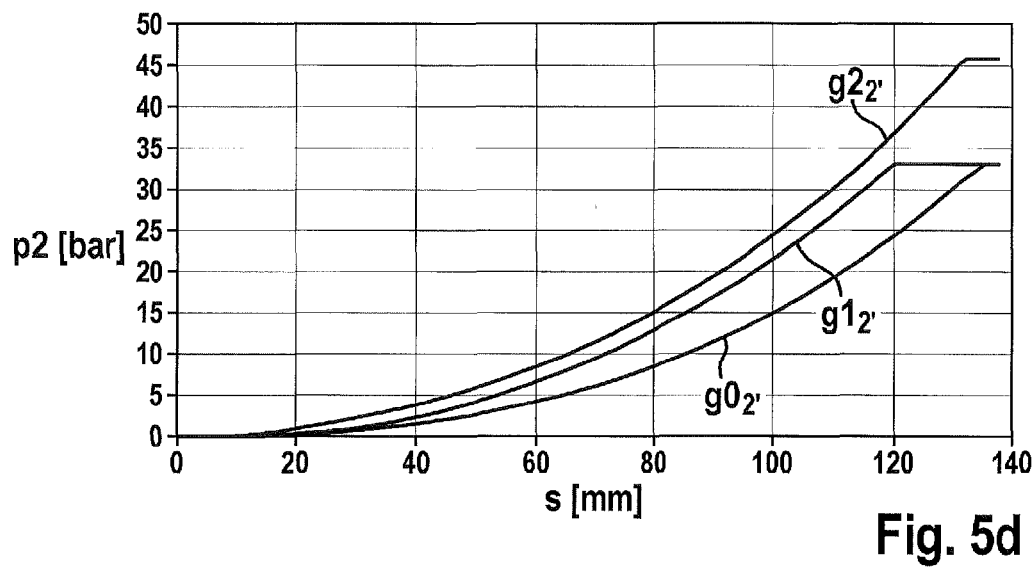
Figure 5E:
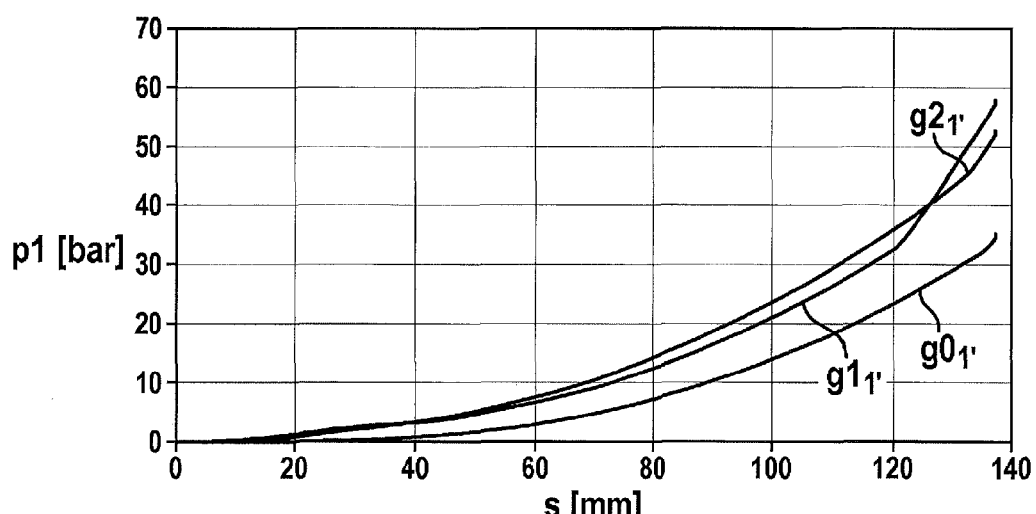

As can be seen on the basis of the coordinate systems of FIGS. 5d and 5e, the increase in pressure brought about by the additional feeding of brake fluid from second partial volume 12b into brake circuits 28 and 32 is more significant if, before the beginning of the braking, air (e.g. 2 cm³) is present in brake circuits 28 and 32. Graphs $g0_1'$ and $g0_2'$ indicate the brake pressures p1 and p2 that may be achieved under standard conditions, i.e. without a transfer of brake fluid from second partial volume 12b into one of the two brake circuits 28 and 32. Graphs $g1_1'$ and $g1_2'$ indicate brake pressures p1 and p2 that may be brought about via a feeding of brake fluid only in first brake circuit 28. The brake pressures p1 and p2 that may be realized through a feeding of brake fluid from second partial volume 12b into the two brake circuits 28 and 32 are shown by graphs $g2_1'$ and $g2_2'$. The feeding of volume from second partial volume 12b thus enables a filling of the air volume with brake fluid, and in this way the achievable maximum pressure increases may be significantly increased. Graph $g2_2'$ has a significantly increased maximum pressure of 46 bar, relative to the maximum pressures of 33 bar in graphs $g0_2'$ and $g1_2'$. Likewise, at 52 bar, graph $g2_1'$ has a slightly reduced maximum pressure relative to a maximum pressure of 58 bar in graph $g1_1'$, but these values are still significantly higher than the maximum pressure of 35 bar in graph $g0_1'$.

Finally, it will be noted that through the feeding of an additional quantity of brake fluid from second partial volume 12b, the brake pressure that may be achieved at the mechanical fallback level when there is a full braking is increased. In this way, the maximum possible vehicle deceleration can also be increased. In particular, this effect also compensates air bubbles that may be contained in brake circuits 28 and 32, which enables an additionally increased maximum brake pressure at the fallback level, and thus a significantly shortened stopping path of the vehicle. The obtained additional volume also improves the braking characteristic from a pressureless braking state due to a faster overcoming of the dead volume, in particular in first brake circuit 28. Through these measures, in addition the deceleration that may be achieved at a mechanical fallback level may be significantly increased without having a disadvantageous influence on the pedal path due to operating states. Thus, using the braking systems described above the vehicle behavior in the mechanical fallback level may be further improved.

Moreover, through the decoupling of the pedal stroke and the pedal force in operation there arises the possibility of designing a fallback level independent of the volume that is to be conveyed during operation.

Master brake cylinder 10, electrically controllable valve 36, and valve device 38 may be a plurality of components that can be configured separately. Equally, master brake cylinder 10, electrically controllable valve 36, and the valve device 38 may also be fashioned as a compact (one-piece) braking device. Here it is noted that the advantages presented above may also be fulfilled by such a braking device for a braking system of a vehicle.

What is claimed is:

1. A braking device for a braking system of a vehicle, comprising:
    a master brake cylinder including at least one first pressure chamber that is subdivided into a first partial volume and a second partial volume, wherein:
        the first partial volume is limited by a first piston wall of at least one displaceable rod piston in such a way that a first volume of the first partial volume is variable by a shifting of the first piston wall, and
        the second partial volume is limited by a second piston wall of the at least one displaceable rod piston in such a way that a second volume of the second partial volume is variable by a shifting of the second piston wall;
    a brake fluid reservoir to which the first partial volume and the second partial volume are one of hydraulically connectable and hydraulically connected;
    a first brake circuit one of hydraulically connectable and hydraulically connected to the first partial volume; and
    a valve device including a check valve as a subcomponent via which the second partial volume is one of connectable and connected at least to the first brake circuit, the valve device being mechanically designed in such a way that in the second partial volume, a pressure is increased up to a maximum of a limit pressure that is mechanically specified at the valve device by shifting the second piston wall, wherein:
        brake fluid is transferred from the second partial volume at least into the first brake circuit via at least the check valve of the valve device when the pressure in the second partial volume reaches or exceeds the limit pressure that is mechanically specified at the valve, and
        despite a further shifting of the second piston wall, an exceeding of the limit pressure in the second partial volume is prevented.

2. The braking device as recited in claim 1, further comprising:
    an electrically controllable valve via which the second partial volume is one of connectable and connected to the brake fluid reservoir in such a way that, when the electrically controllable valve is in an open state, the second partial volume is pressureless despite the shifting of the second piston wall, and, when the electrically controllable valve is in a closed state, the pressure in the second partial volume is increased up to the maximum of the limit pressure mechanically specified at the valve device via the shifting of the second piston wall.

3. The braking device as recited in claim 1, wherein:
    the master brake cylinder includes a second pressure chamber and a floating piston situated displaceably between the first partial volume of the first pressure chamber and the second pressure chamber, and
    a second brake circuit is one of hydraulically connectable and hydraulically connected to the second pressure chamber.

4. The braking device as recited in claim 3, wherein the second partial volume is one of connectable and connected to the second brake circuit via at least one further check valve of the valve device in such a way that brake fluid is transferable into the second brake circuit via at least the further check valve of the valve device.

5. The braking device as recited in claim 1, wherein:
    the master brake cylinder includes a stepped bore inside which at least the first pressure chamber is situated, and
    the master brake cylinder includes a stepped piston as the at least one displaceable rod piston, the stepped piston limiting the first partial volume with the first piston wall, and limiting the second partial volume with the second piston wall.

6. The braking device as recited in claim 1, wherein:
    the valve device includes an excess pressure relief valve via which the second partial volume is one of connectable and connected to the brake fluid reservoir.

7. The braking device as recited in claim 6, wherein the valve device includes a further check valve via which the second partial volume is one of connectable and connected to the second brake circuit.

8. The braking device as recited in claim 1, wherein:
the valve device includes a regulated check valve via which the second partial volume is one of connectable and connected to the brake fluid reservoir.

9. A braking system for a vehicle, comprising:
at least one first brake circuit;
a brake fluid reservoir; and
a master brake cylinder having at least one first pressure chamber that is subdivided at least into a first partial volume and a second partial volume, the first partial volume being limited by a first piston wall of at least one displaceable rod piston in such a way that a first volume of the first partial volume is variable by a shifting of the first piston wall, and the second partial volume being limited by a second piston wall of the at least one displaceable rod piston in such a way that a second volume of the second partial volume is variable by a shifting of the second piston wall, the first partial volume and the second partial volume being hydraulically connected to the brake fluid reservoir, and the first brake circuit being hydraulically connected to the first partial volume;
a valve device, the second partial volume being connected at least to the first brake circuit via a check valve of the valve device, the check valve being a subcomponent of the valve device, the valve device being mechanically designed in such a way that in the second partial volume, a pressure is increased up to a maximum of a limit pressure that is mechanically specified at the valve device by shifting the second piston wall, a brake fluid being transferred from the second partial volume at least into the first brake circuit via at least the check valve of the valve device when the pressure in the second partial volume reaches or exceeds the limit pressure that is mechanically specified at the valve, and, despite a further shifting of the second piston wall, an exceeding of the limit pressure in the second partial volume being prevented.

10. The braking system as recited in claim 9, further comprising:
an electrically controllable valve via which the second partial volume is connected to the brake fluid reservoir in such a way that when the electrically controllable valve is in an open state, the second partial volume is pressureless despite the shifting of the second piston wall, and when the electrically controllable valve is in a closed state, the pressure in the second partial volume is increased up to the maximum of the limit pressure mechanically specified at the valve device, by shifting the second piston wall.

11. The braking system as recited in claim 9, wherein the master brake cylinder has a second pressure chamber and a floating piston displaceably situated between the first partial volume of the first pressure chamber and the second pressure chamber, and a second brake circuit being hydraulically connected to the second pressure chamber.

12. The braking system as recited in claim 11, wherein the second partial volume is connected to the second brake circuit via at least one further subcomponent of the valve device in such a way that brake fluid is transferable into the second brake circuit via at least the further subcomponent of the valve device.

13. The braking system as recited in claim 9, wherein the master brake cylinder includes a stepped bore inside which at least the first pressure chamber is fashioned, and the master brake cylinder having a stepped piston as the at least one displaceable rod piston, which limits the first partial volume with the first piston wall, and limits the second partial volume with the second piston wall.

14. The braking system as recited in one of claim 9, wherein:
the valve device has an excess pressure relief valve via which the second partial volume is connectable to the brake fluid reservoir, and
the valve device has, as a subcomponent of the valve device, at least one check valve via which the second partial volume is connectable at least to the first brake circuit.

15. The braking system as recited in claim 9, wherein:
the valve device has a regulated check valve via which the second partial volume is connected to the brake fluid reservoir.

16. The braking system as recited in claim 9, further comprising an external force braking device.

17. The braking system as recited in claim 16, wherein:
the valve device has an excess pressure relief valve via which the second partial volume is connected to the brake fluid reservoir, and
the valve device has, as a subcomponent of the valve device, at least one lip seal of the external force braking device fashioned as a plunger.

18. The braking system as recited in claim 9, wherein:
the braking system has a control device that is designed to control, in a normal mode, at least one component of the braking system in such a way that the pressure in the second partial volume is increased up to the maximum of the limit pressure mechanically specified at the valve device, by the shifting of the second piston wall in the second partial volume.

* * * * *